United States Patent [19]
Meek et al.

[11] Patent Number: 5,921,325
[45] Date of Patent: Jul. 13, 1999

[54] LOW TRANSPORT HEIGHT STACK FOLD IMPLEMENT

[75] Inventors: Roger L. Meek, Salina; Stanley R. Clark, Hesston; Michael J. Dresher, Canton; Timothy J. Ptacek, Salina, all of Kans.

[73] Assignee: Great Plains Manufacturing, Incorporated, Salina, Kans.

[21] Appl. No.: 08/878,281

[22] Filed: Jun. 18, 1997

[51] Int. Cl.$^6$ ..................................................... A01B 49/00
[52] U.S. Cl. .......................... 172/311; 172/662; 172/458; 111/52
[58] Field of Search ..................................... 172/310, 311, 172/456, 634, 637, 776, 501, 466, 662, 452, 458, 481; 111/52–55

[56] References Cited

U.S. PATENT DOCUMENTS

| | | | |
|---|---|---|---|
| 3,797,580 | 3/1974 | Roth | 172/311 |
| 4,023,623 | 5/1977 | Anderson | 172/311 |
| 4,126,189 | 11/1978 | Channel . | |
| 4,206,815 | 6/1980 | Hatcher . | |
| 4,355,690 | 10/1982 | Jensen et al. | 172/311 |
| 4,415,043 | 11/1983 | Hadler et al. . | |
| 4,418,763 | 12/1983 | Boetto | 172/311 X |
| 4,453,601 | 6/1984 | Orthman et al. | 172/311 |
| 4,461,356 | 7/1984 | Larson . | |
| 4,479,554 | 10/1984 | Kueker | 172/311 |
| 4,529,040 | 7/1985 | Grollimund | 172/311 |
| 4,632,417 | 12/1986 | Hodapp . | |
| 4,646,851 | 3/1987 | Duello . | |
| 4,862,758 | 9/1989 | Magee | 172/311 X |
| 4,878,545 | 11/1989 | Dyken . | |
| 5,346,019 | 9/1994 | Kinzenbaw et al. . | |

FOREIGN PATENT DOCUMENTS

| | | |
|---|---|---|
| 424522 | 9/1974 | U.S.S.R. . |

OTHER PUBLICATIONS

Acme Manufacturing Co., Inc. brochure, Entitled; Acme Tool Carriers, Rugged–Versatile–Transportable (date unknown).

Todd's Fabrication Inc. brochure, Entitled; The Stacking Tool Bar with Maximum Versatility (Sep. 1992).

Orthman Manufacturing, Inc., 900 Series Stacker Bar brochure, Entitled; The Innovative Folding Toolbar and Row Maker (Oct. 1994).

Black Machine, Inc. brochure, Entitled; Why Invest in Two Planters? 2–in–1 Folding Planters (date unknown).

Kinze Manufacturing, Inc. brochure, Entitled; Kinze 2000 Series Planters (Jan. 1995, Rev Aug. 1996).

White brochure, Entitled; 6000 Series Planters, Managing for Profit (1992).

John Deere brochure, Entitled; Maxemerge 2 Planters (95–03) Mar. 1995.

*Primary Examiner*—Victor Batson
*Attorney, Agent, or Firm*—Hovey, Williams, Timmons & Collins

[57] ABSTRACT

A stack folding implement has a transverse frame that includes a center section and two opposite wing sections half as wide as the center section. Each of the wing sections is connected in a four bar linkage relationship with the center section so that as the wings are lifted by cylinders coupled with the linkages, the wing sections stay generally level and upright, causing the wing sections to come into stacked relationship with the center section directly above the latter and beside one another. In order to reduce the overall height of the stack-folded machine the linkage for each wing section is connected to the wing adjacent the inner end of the wing so that the wing is supported in a cantilever manner. The main lifting link of the linkage is designed to swing through an arc greater than 90° to permit the wing sections to settle down close to the center section in their final positions of rest. In one embodiment the inner stabilizing link of the linkage for each wing includes a telescoping piston and cylinder assembly and a rocker lever that pivotally connects the anchor end of the cylinder to the center frame section. In a second embodiment the inner stabilizing link comprises a non-extensible, rigid link having a lost-motion pivot coupling with the center frame section.

28 Claims, 8 Drawing Sheets

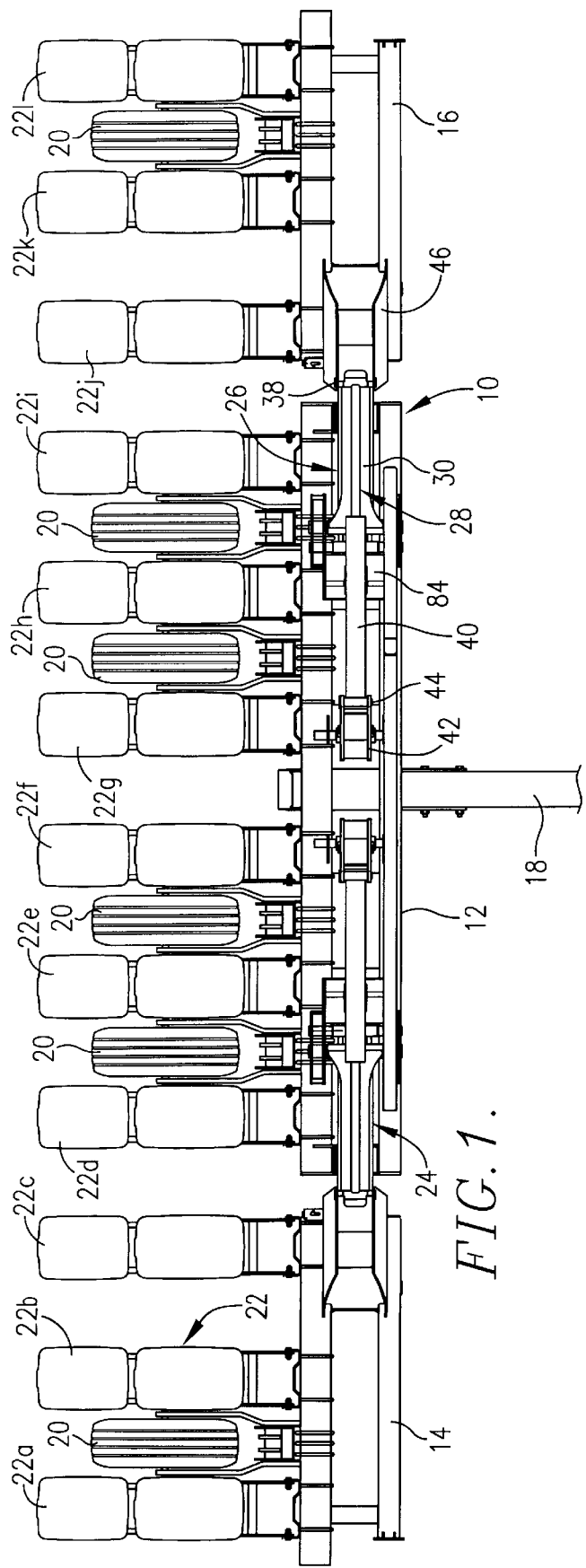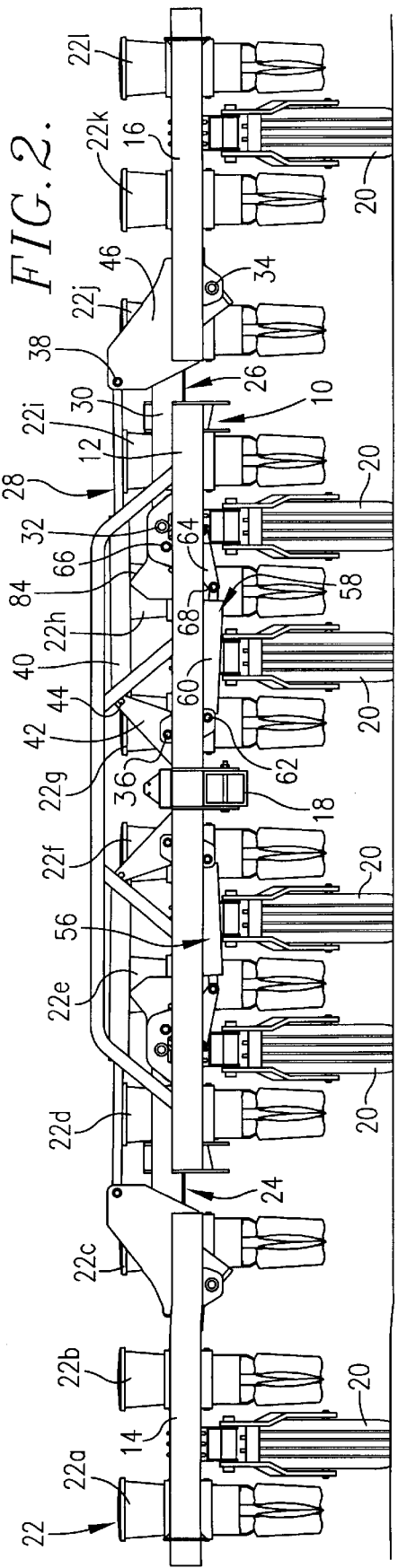

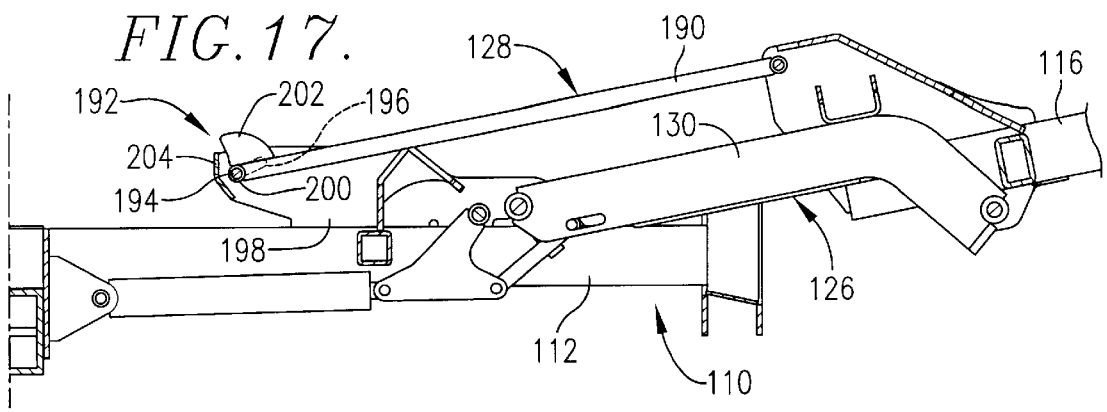
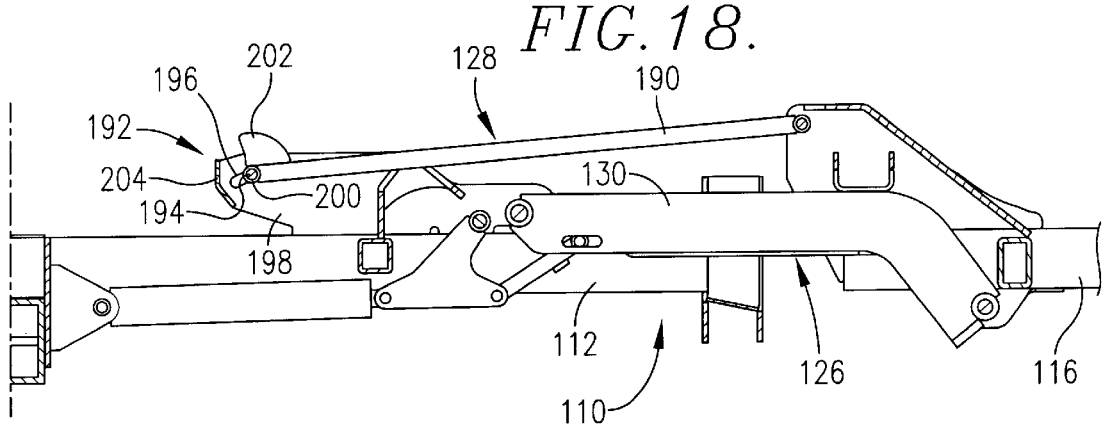
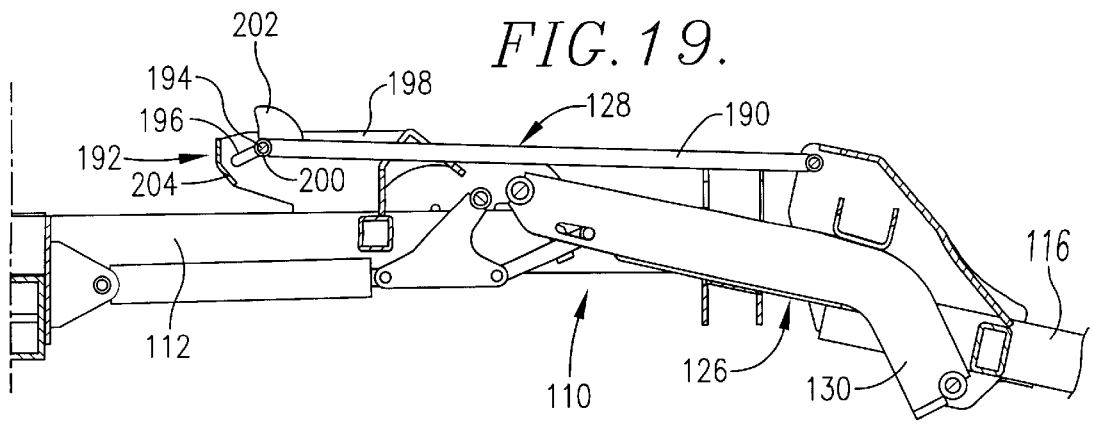

LOW TRANSPORT HEIGHT STACK FOLD IMPLEMENT

TECHNICAL FIELD

This invention relates to the field of farm implements that can be folded between field-working and transport positions, and, more particularly, to implements of the type in which folding wing sections are stored directly above a center frame section in a "stacked" condition when the frame is folded up for transport.

BACKGROUND

Stack folding implements are not broadly new. Typically, such implements comprise planters in which the openers must remain in a generally level condition when the frame is folded up so that the contents of the individual seed and fertilizer boxes will not be spilled. Prior machines are typically equipped with a center section and a pair of wing sections on opposite sides of the center section, with each wing being approximately half as wide as the center section. Thus, when the two wings are folded up into their stacked positions overlying the center section, they come into side-by-side relationship with one another to greatly reduce the total width of the machine. However, because the wings are positioned above the center section, the machine is significantly taller than it was in the unfolded condition, and in some prior machines portions of the wings or the folding mechanism still project outwardly beyond the center section to some extent.

Prior stack folding machines have utilized two sets of four-bar linkages between the center section and the wings to keep the wings generally level as they are lifted and lowered between their transport and working positions. However, the design of previous machines is such that when the wings are disposed in their stacked positions, there is a large amount of wasted space between the center section and the overhead wing sections. Thus, the transport height of the machine is excessive.

SUMMARY OF THE PRESENT INVENTION

Accordingly, one important object of the present invention is to provide a stack-folding implement having a lower transport height than heretofore available so that the package presented by the folded machine is more compact overall than prior machines, thus facilitating passage through gates, compliance with road width requirements, and increasing overhead clearance to avoid interference with power lines, phone lines, tree limbs and the tops of door openings in storage sheds. It is also important to provide a stack-folding implement in which the wings when folded are no wider than the center section itself so that the width of the center section is the determining factor for road width, gate clearance and the like.

It is also important to achieve a lower transport height while making certain that the tools on the wing sections do not strike other parts of the machine as the wing sections are folded and unfolded. There must always be adequate clearance to avoid structural interference not only when the wing sections are resting in their stacked positions overlying the center section, but also during translating movement as they shift around the outer end of the center section between the transport and working positions.

In achieving lower transport height without causing this interference problem, it is desirable to find a way to keep the wings from moving beyond the center line of the center section and into the other wing's territory above the center section as they are folded. In other words, each wing must be limited to occupying only its half of the space above the center section as the machine is folded and not cross over into the other wing's space if collision between the wings is to be avoided.

Another important object of this invention is to achieve lower transport height in a stack folding machine without sacrificing flotation, so that each of the wings can float independently of one another and the center section to the extent necessary to accommodate variations in ground contour.

Still further, an important object is to provide a way of having one link of each four-bar linkage swing through an arc that substantially exceeds 90° during lifting and lowering of its wing.

Additionally, an important object is to provide a way of preventing the heavy, floatable wing sections from subjecting the linkages and other components of the machine to severe slamming loads as the center of gravity of each wing passes over center during the folding and unfolding action.

The above and other important objects are carried out in the present invention by connecting each wing section to the center section in a special four-bar linkage arrangement. Each wing section is supported by its linkage in a cantilevered manner wherein both links of the linkage connect to the wing section inboard of the center of gravity of the wing and inboard of the midpoint of the wing. The outer link of each linkage is somewhat shorter than the inner link, and the distance between pivot connections on the wing is less than the distance between the pivot connections on the center frame.

In one preferred embodiment of the invention, the inner link of each linkage comprises a hydraulic cylinder. The outer link is operated by another hydraulic cylinder, and in order to permit the outer link to swing through an arc greater than 90°, there is a special crank connector between the outer end of the cylinder and the outer link. The two cylinders of each linkage are connected in a master-slave relationship so that as the wing is lifted into its transport position, the cylinder for the outer link is the master and the cylinder comprising the inner link is the slave. On the other hand, as the wing is unfolded, the roles of the two cylinders are reversed. A special lock is engaged as the wing nears the top-dead-center position during folding so as to prevent the wing from falling through a lost-motion portion of travel that is available to provide flotation when the wing is down in its working position.

In a second preferred embodiment of the invention, the inner link cylinder of each linkage is replaced by a rigid link which remains of fixed length throughout folding and unfolding operations. A lost-motion coupling between the inner end of the link and the center frame section permits free and independent flotation of the wing in its field position to the same extent as in the previous embodiment, but a locking cam on the rigid link automatically disables the lost-motion effect of the coupling when the wing is in its folded position.

BRIEF DESCRIPTION OF THE DRAWINGS

FIG. 1 is a top plan view of a stack-folding implement embodying the principles of the present invention, the particular implement illustrated comprising a twelve-row planter;

FIG. 2 is a front elevational view thereof with the openers raised out of the ground;

FIGS. 17–19 are fragmentary front elevational views of the second embodiment illustrating the flotation ability of the wing.

DETAILED DESCRIPTION

Figure 3:
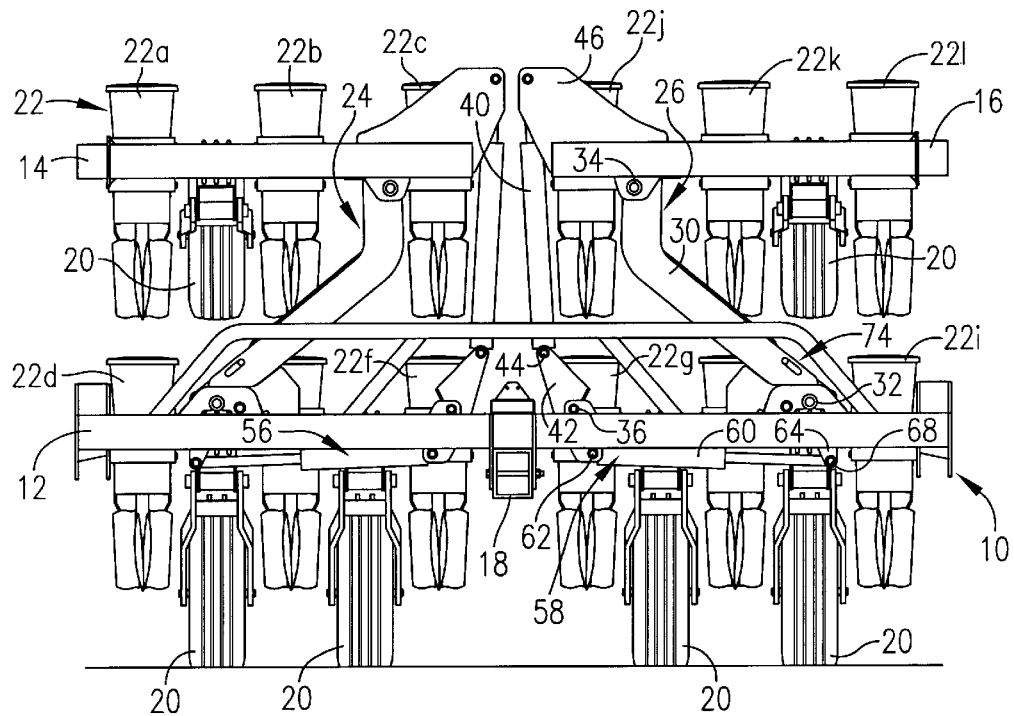
FIG. 3 is a front elevational view of the planter in its folded condition.

The implement selected for purposes of illustration in FIG. 1 is a row crop planter having a three-section transverse frame 10 comprising a center section 12 and two wing sections 14 and 16 on opposite lateral sides of the center section 12. A tongue 18 is secured to the center section 12 and extends forwardly therefrom for hitching the implement to a towing tractor (not shown). Ground wheels 20 on the frame sections 12, 14 and 16 support the frame 10 for travel. However, as well understood in those skilled in the art, the wheels 20 are preferably controlled by hydraulic cylinders (not shown) so that the wheels 20 may be raised during field operations, causing the frame 10 to be lowered toward the ground such that tools carried thereon may engage and work the soil in the intended manner. As will be appreciated, certain aspects of the invention are not limited to any particular number of frame sections. They are also broad enough to encompass folding frames or tool bars with or without tools attached thereto.

In the illustrated embodiment, such tools comprise a series of twelve openers 22a–22l spaced along the backside of the frame at equal intervals. The center frame section 12 carries six openers (22d–22i), while the two wings carry three each (22a–22c and 22j–22l). Each of the wings is connected to the center section in a four bar linkage arrangement so that the wings are generally level whether in their field position of FIG. 2 or their stacked positions of FIG. 3. Although portions of the frame sections themselves form parts of the four bar linkage for each wing, for the sake of simplicity and ease of understanding the two four bar linkages will be designated by the numerals 24 and 26 respectively and will be characterized as connecting the wings and the center section together, rather than as comprising portions of such wing and center sections. In actual practice, each four bar linkage includes not only a pair of links 28 and 30 extending between the center section and the wing, but also two more links or "bars" comprising the structure between the connection points of the links to the wing and the structure between the connection points of the links to the center section.

Figure 4:
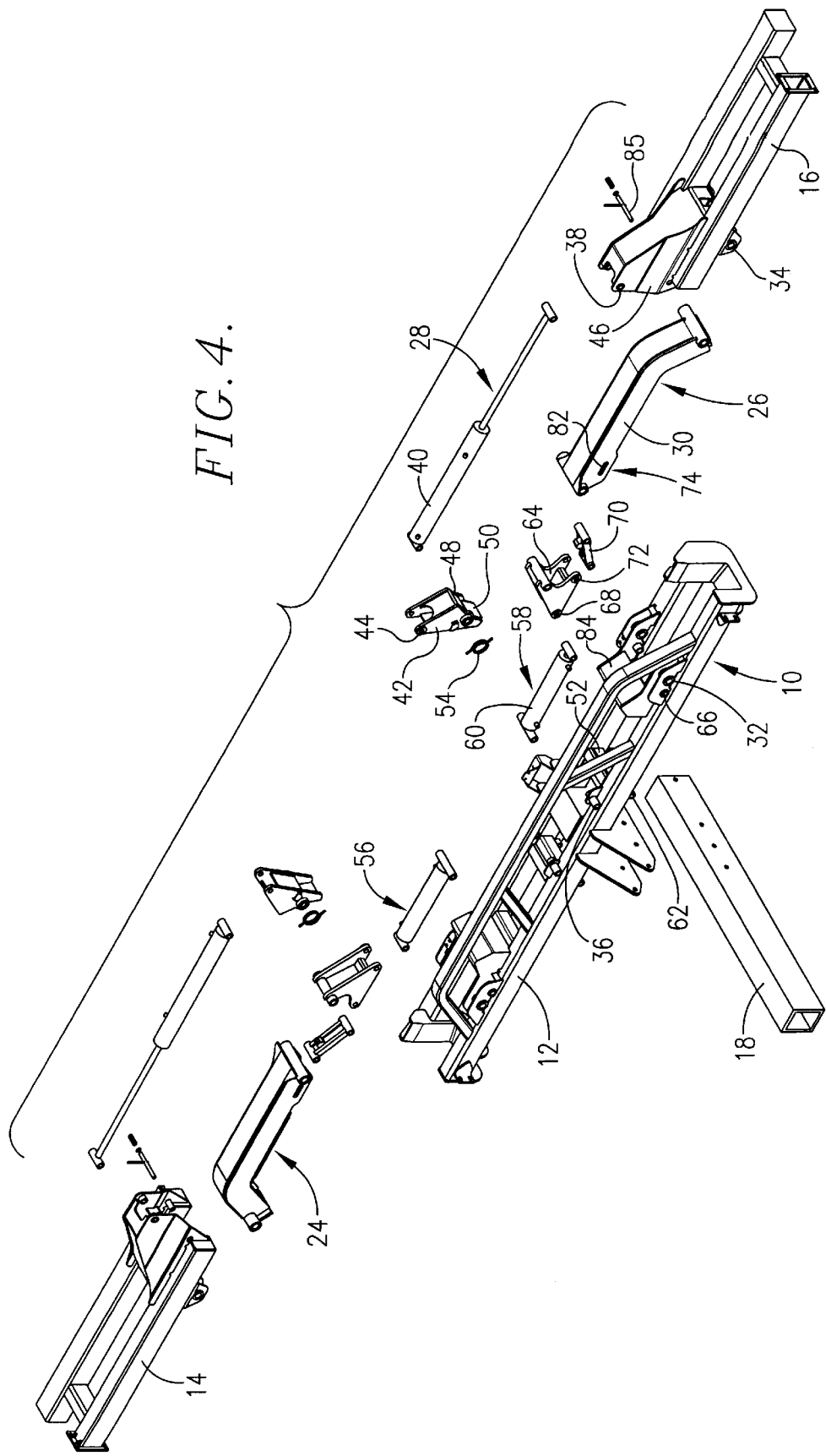
FIG. 4 is an exploded illustration of the center and two wing sections of the frame, together with the four-bar linkage and power mechanism that raises and lowers the wings.

With reference to the exploded view in FIG. 4 as may be appropriate to comprehend the various individual components of the machine, it will be seen that the outer link 30 of each linkage 24,26 is connected at its inner end to the center section 12 by a fore-and-aft pivot 32 and at its opposite outer end to the corresponding wing section 14 or 16 by a fore-and-aft pivot 34. The link 30, which provides the lifting force for the wing, is of heavy-duty construction and is fabricated from a number of welded plates to present a tubular construction that is generally rectangular in cross-sectional configuration. Link 30 is designed to partially nest down within the center frame section 12 when the wing is lowered. It will be noted in this respect that the center frame section is generally transversely U-shaped in cross-sectional configuration at its outer end so as to complementally receive the link 30 when it is in its lowered position as in FIGS. 1 and 2. Preferably, all three frame sections 12, 14 and 16 are disposed in end-to-end alignment with one another across the path of travel of the machine and the two four bar linkages 24,26 are symmetrically disposed on the transverse line of centers running through and between the three end-to-end frame sections. The outer end of the link 30 is down-turned so as to position such outer end in registration with the pivot 34, which is located on the underside of the wing at a point lower than the pivot 32 on the center section when the wing is in its field position.

Figure 5:
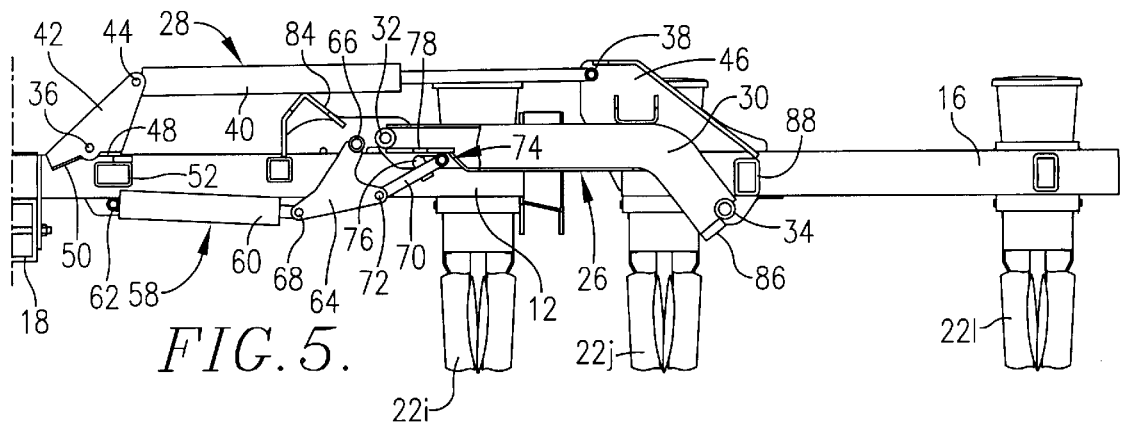
FIG. 5 is a front elevational view of the left half of the machine (as viewed from the rear) showing the left wing section down in its working position (several of the openers have been removed for the sake of clarity in this figure and those that follow)

The inner link 28 of each four bar linkage 24,26 provides a stabilizing function for the wing during folding and unfolding and has a pivotal connection 36 at one end with the center section 12 and a pivotal connection 38 at the opposite end with the wing 14 or 16. In one preferred form, the inner link 28 comprises a hydraulic cylinder 40 and a rocker lever 42 pivoted to the anchor end of the cylinder 40 by a pivot 44. The rocker lever 42 is directly connected to the center section by the pivot 36, while the cylinder 40 is directly connected to the wing section by the pivot 38. The pivot 38 is located at the upper end of a generally upstanding bracket 46 on the inner end of the wing. The rocker lever 42 can rotate back and forth through an arc of approximately 66° between one extreme position illustrated in FIG. 5 and an opposite extreme position illustrated in FIG. 10. A pair of stop pads 48 and 50 on the rocker lever 42 are engageable with adjacent portions of a fore-and-aft member 52 on the center section 12 to limit the extent of rotation of the lever in its opposite directions. A torsion spring 54 shown only in FIG. 4 yieldably biases the rocker lever 42 toward its FIG. 5 position in which the stop pad 48 is down against the frame member 52.

Figure 14:
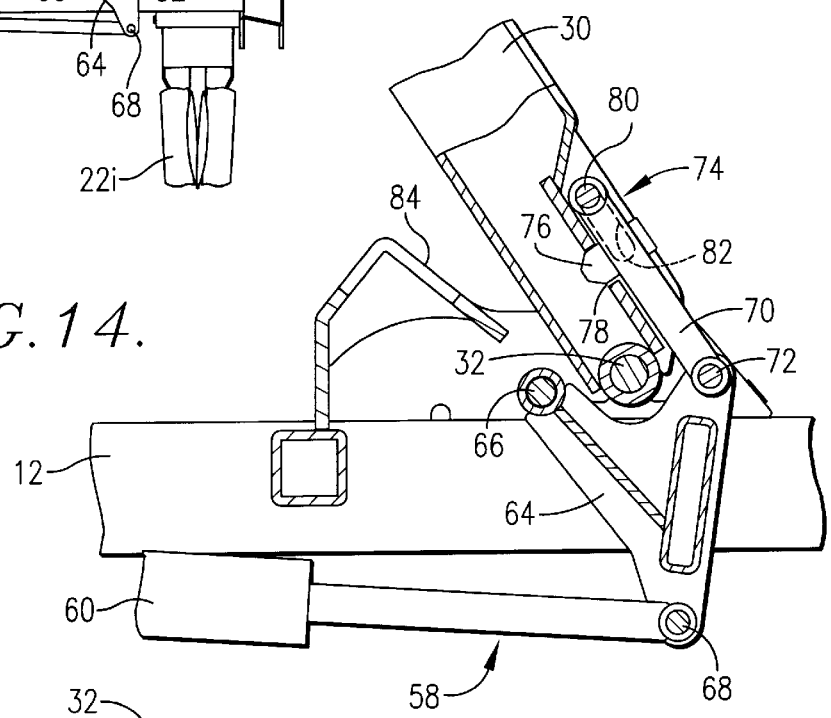
FIG. 14 is an enlarged, fragmentary elevational view of the lower pivot area of the outer lifting link with parts broken away and shown in cross-section to reveal details of construction.
Figure 15:
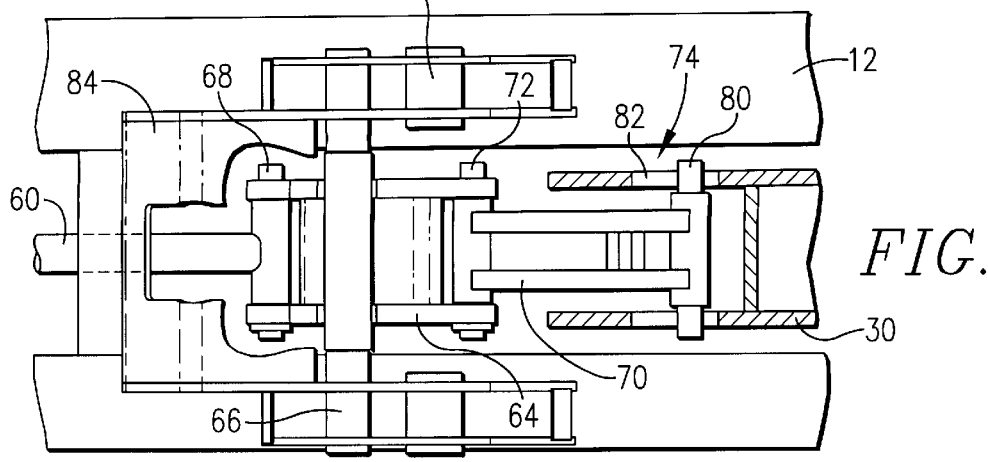
FIG. 15 is an enlarged, fragmentary top plan view of the same area showing details of construction.

The two linkages 24 and 26 are operated by respective power mechanisms 56 and 58. Using the mechanism 58 for linkage 26 as an example, it will be seen that each power mechanism includes a lift cylinder 60 anchored to the center section by a pivot 62 located below and generally vertically aligned with the pivot 36 of the rocker lever 42. The power mechanism 56 further includes a connector yoke 64 having one leg connected to the center section by a pivot 66, a second leg connected to the rod end of the cylinder 60 by a pivot 68, and the third leg connected to a strap 70 by a pivot 72. The strap 70 comprises the third major component of the power mechanism 56 and is coupled with the outer link 30 by a lost motion coupling 74. The lost motion coupling 74 comprises a pin-and-slot arrangement as illustrated, for example, in FIGS. 11, 12 and 13 so that the wing section can float up and down between certain limits relative to the center section without extending and retracting the lift cylinder 60. As shown particularly in FIG. 14, the strap 70 has a locking projection 76 that is disposed to enter into a receiving socket 78 on the outer link 30 after the wing section has been lifted almost to its top dead center position so that the pin 80 of the lost motion coupling 74 remains locked against the outer end of the slot 82 of coupling 74 as the wing section passes over center when moving toward the stacked position. Because the pin 80 is at the upper end of the slot 82 as the link 30 is lifted from the field position, the projection 76 becomes lined up with the socket 78. Continued lifting causes the strap 70 to swing progressively closer to the socket 78, finally causing the projection 76 to enter socket 78 as the link 30 approaches vertical. Once projection 76 is received within the socket 78, it cannot withdraw therefrom until the strap 70 moves away from the socket 78 during unfolding. An upstanding rest 84 is disposed to engage and limit the travel of the outer link 30 as it goes over center, thus defining the stacked position for the wing.

As best illustrated in FIGS. 5–10 with respect to linkage 26, each linkage is connected to its corresponding wing section 14,16 substantially inboard of the outer end of that section. It will be appreciated that the center of gravity and mid-point of the wing section 16 are located outboard of the pivot connection 34 between the outer link 30 and the wing section 16 so that the wing is cantilevered by the linkage. Moreover, the outer link 30 is shorter than the inner link 28, and the distance between the pivots 38,39 is less than the distance between the pivots 36,32. Preferably, the pivot 32 for the outer link 30 is just inboard of the end opener 22i on the center section, while the pivot 34 is located just outboard of the next opener 22j on the wing section 16.

OPERATION

When the planter is in the field but the openers 22 are not in the ground, the machine appears as shown in FIG. 2. Typically, this is the condition of the machine at the end of the row in the headlands region of the field where the operator needs to lift the openers out of the ground and turn the machine around before beginning the next pass.

Figure 12:
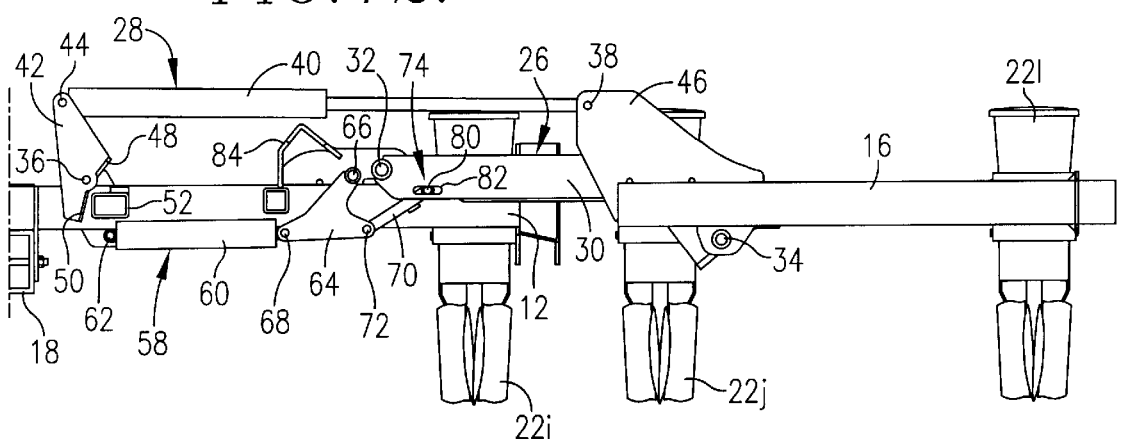
FIG. 12 shows the left wing in its level condition.
Figure 13:
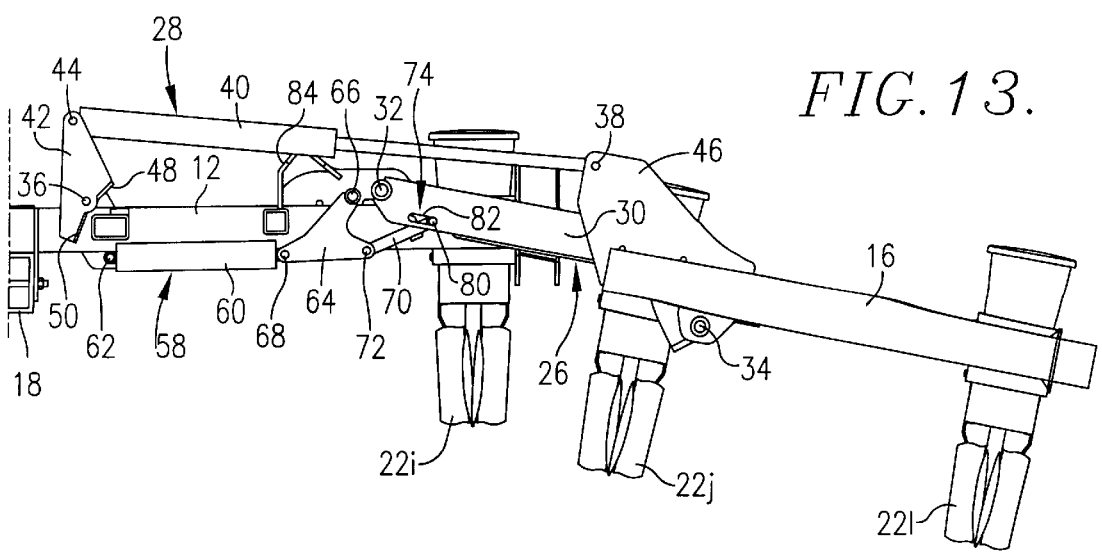
FIG. 13 shows the left wing in its floated down position.

After the openers are then lowered into the ground, the machine assumes the condition illustrated in FIG. 12 wherein, assuming the ground is level, the wing sections are substantially level with the center section. The hydraulic circuitry is such that when the openers are in the ground, fluid is locked in the lift cylinder 60 and the link cylinder 40 so that they do not extend or retract during field operations. Additionally, a mechanical lock 85 (shown only in FIG. 4) may be used to lock each link 30 and wing section together when the machine is unfolded. However, relative flotation between the frame sections is provided by the lost motion coupling 74 and the rocker lever 42. For example, when the wing 16 is level with the center section 12 as in FIG. 12, the pin 80 of lost motion coupling 74 is generally in the center of the slot 82. Likewise, the rocker lever 42 has its stop pads 48 and 50 spaced from the frame member 52.

Figure 11:
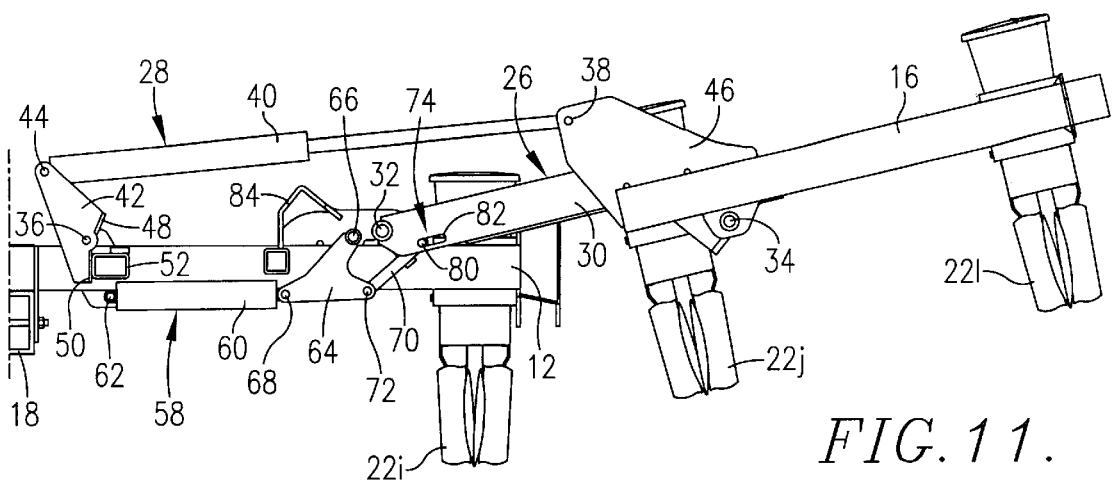
FIG. 11 is a front elevational view of the left half of the machine illustrating the left wing in its full upwardly floated position relative to the center section.

In the event that a rise is encountered by the wing section 16 as illustrated in an exaggerated manner in FIG. 11, the lost motion coupling 74 allows the wing to swing up until the pin 80 reaches the inner end of the slot 82. The floating action of the wing section 16 is about the inner pivot 32 of the outer link 30 rather than about the outer pivot 34. Additionally, the rocker lever 42 can rotate in a counter-clockwise direction viewing FIG. 11 until the stop pad 50 comes into engagement with the frame member 52. On the other hand, if the wing section 16 encounters a depression relative to the center section 12 as illustrated in an exaggerated manner in FIG. 13, the wing section can swing down about the pivot 32 until the pin 80 reaches the outer end of the slot 82. Rocker lever 42 can rotate clockwise until stop pad 48 comes into engagement with the frame member 52.

When the operator wishes to fold up the machine, he first raises the frame by actuating the hydraulic cylinders (not shown) associated with the ground wheels 20 to cause the frame to rise. This places the machine in the condition of FIGS. 2 and 5 wherein the lift cylinder 60 is essentially fully retracted and the link cylinder 40 is essentially fully extended.

Figure 6:
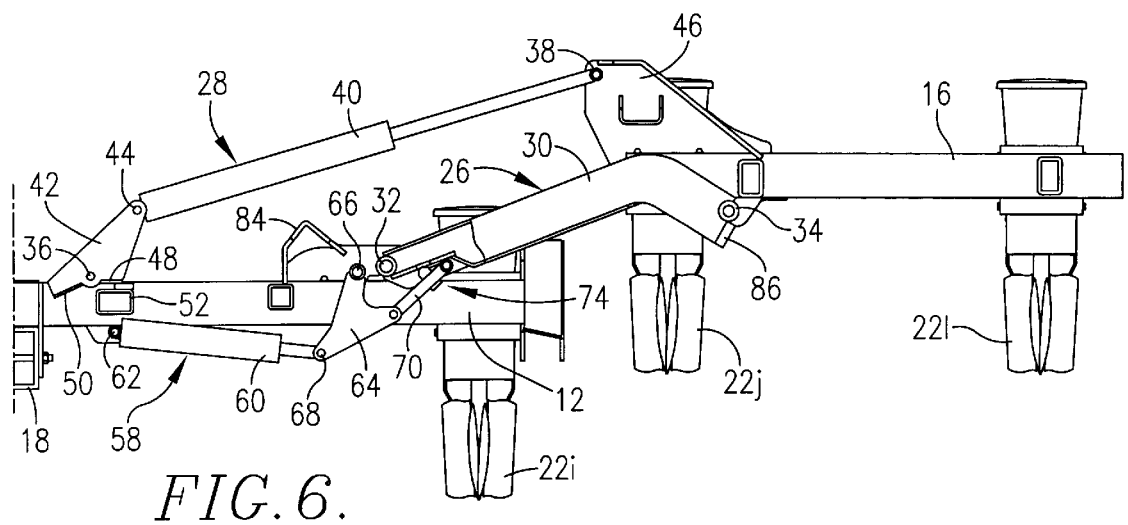
FIG. 6 is a front elevational view similar to FIG. 5 but showing the wing slightly raised as the folding action commences.
Figure 7:
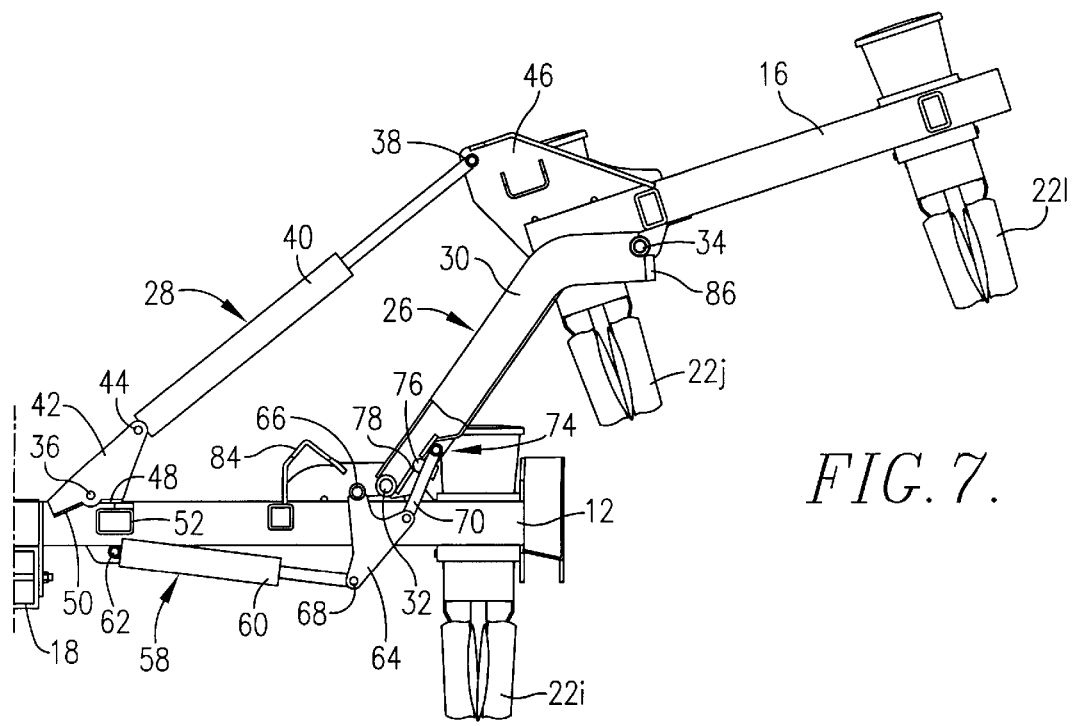
FIG. 7 is a similar view of the machine showing the wing almost to its top-dead-center position.

As oil is pumped to the lift cylinder 60, its rod extends to take up the lost motion in coupling 74. Once the pin 80 reaches the outer end of the slot 82, further extension of the lift cylinder 60 causes the outer link 30 to swing upwardly about its pivot 32 as shown in FIG. 6, thus lifting the wing section off the ground. Due to the presence of the link cylinder 40, the wing section is not permitted to swing out of control in a clockwise direction about the pivot 34 as it is raised, but is instead stabilized and controlled so as to remain in a generally level condition. However, because the lift cylinder 60 is a master and the link cylinder 40 is the slave, oil forced out of the lift cylinder 60 during its extension is forced into the link cylinder 40 to cause it to simultaneously retract. Thus, the link cylinder 40 performs the function of pulling down on the bracket 46 of the wing section as the wing section it is being lifted, slightly tilting the wing section as shown in FIG. 7 to provide and extra measure of clearance between the press wheels of the opener 22j on the wing section and the seed box on the opener 22i on the center section.

Figure 8:
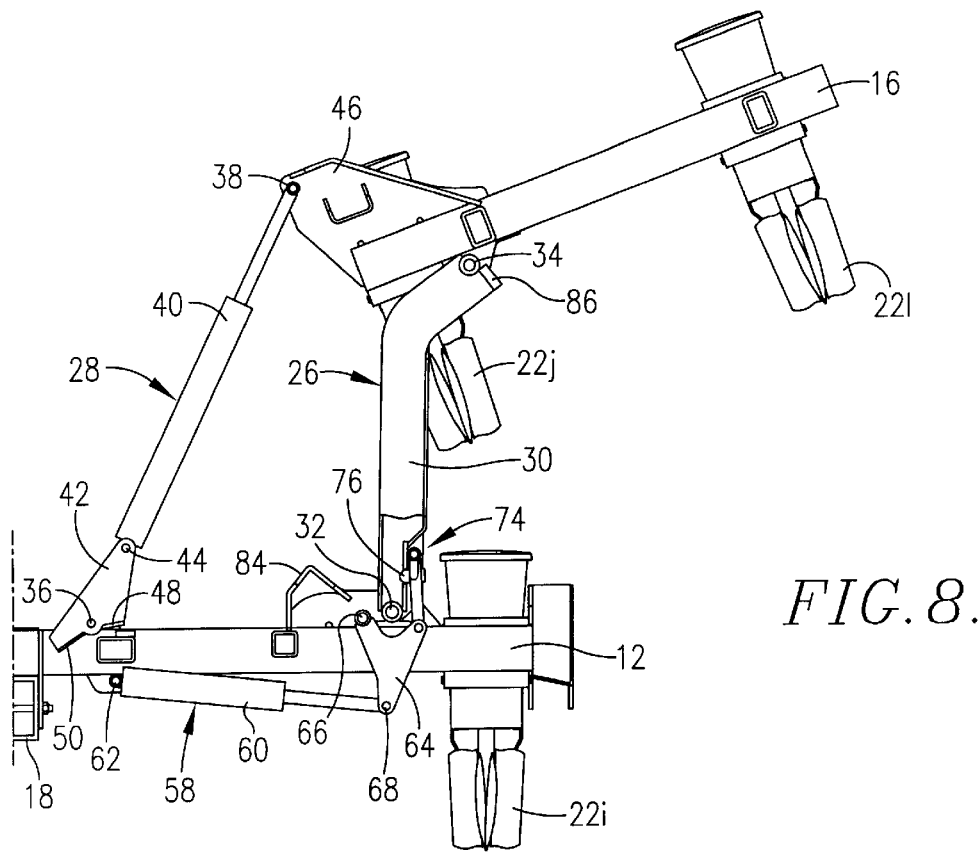
FIG. 8 is a view similar to FIGS. 5–7 that illustrates the wing close to its top-dead-center position.

By the time the wing section reaches the position in FIG. 8 in which the outer link 30 is essentially vertical, the locking projection 76 associated with the strap 70 has entered the receiving socket 78, effectively locking the lost motion pin 80 in its position at the far end of the slot 82. The lift cylinder 60 continues to extend and the link cylinder 40 continues to retract so that as the wing is lifted upwardly and inwardly into an overhead position above the center section, the wing remains somewhat tilted at this time.

Figure 9:
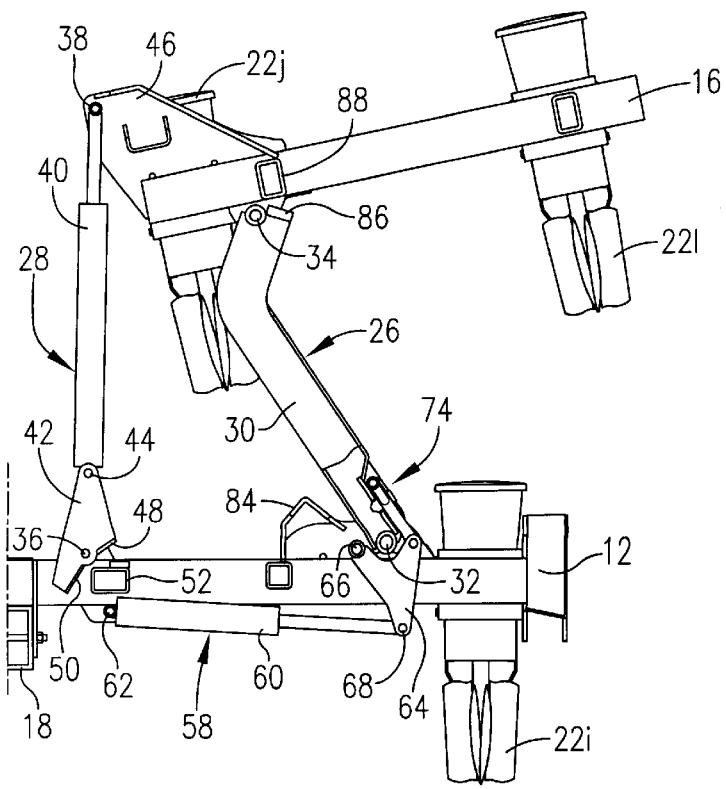
FIG. 9 is a view similar to FIGS. 5–8 with the wing passing over its top-dead-center position.

As the center of gravity of the wing section passes across top-dead-center and moves to the position in FIG. 9, the weight of the wing section tends to push the outer link 30 on down around in a counterclockwise direction toward the rest 84. Thus, were it not for the fact that the lost motion coupling 74 is locked at this time, the link 30 would effectively become temporarily disconnected from the lift cylinder 60 until the link has swung down far enough to have the lost motion pin 80 bottom out in the opposite end of the slot 82. However, inasmuch as the pin 80 is locked up against the far end of the slot 82 at this time, the weight of the wing section merely has the effect of pulling out on the rod of the lift cylinder 60 at a rate limited by appropriate orificing within the hydraulic circuit. As the lift cylinder 60 thus continues to extend, the link cylinder 40 continues to retract, and as the upper pivot 34 of the outer link 30 begins to swing downwardly in a clockwise direction relative to the upper pivot 38 of the link cylinder 40, the wing section starts to assume a more level attitude.

Figure 10:
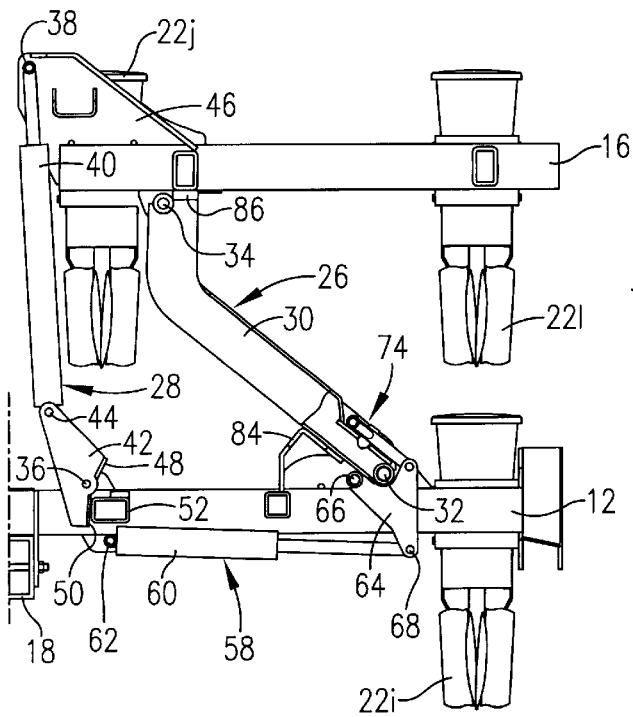
FIG. 10 is a view similar to FIGS. 5–9 showing the wing fully folded in its stacked position above the center section.

Finally, as shown in FIG. 10, the outer link 30 comes to rest against the rest 84 while, at the same time, a stop 86 on the outer end of the link 30 comes to bear against the bottom of a fore-and-aft member 88 on the wing frame. At this time, the wing section is almost completely level, is disposed directly above and in vertical alignment with the left half of the center section 12, and extends no further outwardly than the center section 12. A relatively compact package of low transport height and having a maximum width determined by the width of the center section itself is thus presented as shown in FIG. 3.

It will be noted in FIG. 3 that the link cylinders 40 for the two wing sections slightly diverge downwardly and outwardly with respect to one another when the machine is completely folded. Although the cylinders are shown only slightly diverged, in practice the tension springs 54 (FIG. 4) bias the cylinders further apart of this time. Such additional divergence of the cylinders 40 at their lower ends provides better visibility for the operator as he looks rearwardly from the tractor.

ALTERNATIVE EMBODIMENT

In an alternative form of the invention as illustrated in FIGS. 16–19, the cylinder link 40 and rocker lever 42 of the first embodiment are replaced with a rigid, non-extensible link. In this embodiment, the tilt angle of the wing section as it rises into the stacked position will be slightly different than that illustrated in FIGS. 5–10, but the wing section will still settle into a generally level condition once fully lifted, and the extent of flotation will remain the same. The non-extensible link has a lost-motion pivot connection with the center section to provide flotation, and an appropriate lock mechanism is provided in combination with the lost-motion connection to disable the lost motion effect during fold up.

Figure 16:
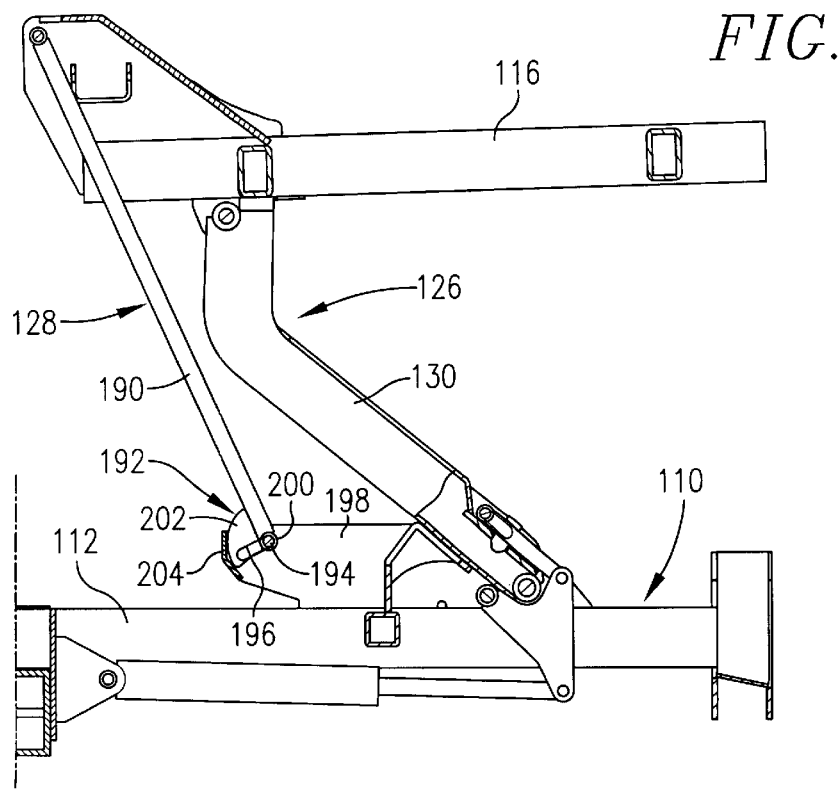
FIG. 16 is an enlarged, fragmentary front elevational view of a second embodiment of the invention in which a rigid link replaces the telescoping cylinder and rocking lever of the first embodiment, the frame in this figure being illustrated in its folded condition with parts broken away and shown in cross-section to reveal details of construction.

In FIGS. 16–19, the frame 110 has its wing section 116 controlled by a linkage 126. The outer lifting link 130 is the same as the link 30 of the first embodiment, but the inner stabilizing link 128 comprises a rigid, non-telescoping link 190 having a lost-motion pivot coupling 192 with the center frame section 112. The lost-motion coupling 192 comprises a pin and slot arrangement that includes a transverse pin 194 across the lower end of the link 190 and a pair of upwardly and outwardly angled slots 196 (only one being shown) in a pair of upstanding, fore-and-aft spaced mounting plates 198 on the center frame section 112 (only one of such plates 198 being illustrated). The pin 194 is slightly longer than the distance between the two plates 198 such that opposite ends of the pin 194 are received within corresponding ones of the slots 196. A transverse bearing tube 200 fixed to the lower end of the link 190 rotatably receives the pin 194 between the plates 198 to allow the link 190 to pivot relative to the pin 194. As illustrated in FIG. 16, a crescent-shaped cam plate 202 rigidly affixed to the link 190 at its lower end is disposed to bear against a transverse stationary guide plate 204 between the support plates 198 so as to effectively lock the pin 194 up in the far end of the slot 196 when the wing 116 is in or near its final stacked position of FIG. 16. This effectively disables the lost-motion action of the pin 194 within the slots 196 but still permits the link 190 to pivot about the pin 194 during movement near the final stacked position. On the other hand, when the wing section 116 is in its field position, the cam plate 202 is out of engagement with the guide plate 204 so that the wing is free to float as illustrated in FIGS. 17–19.

In all other respects, the embodiment of FIGS. 16–19 is substantially the same as the embodiment of FIGS. 1–15. In both of the illustrated forms of the invention the stack folded machine provides a low profile, relatively narrow width unit which facilitates transport. In both embodiments, the overall width of the folded package is no greater than the width of the center frame section itself.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a stack folding implement, the improvement comprising:

a transverse mobile frame including a center section and a pair of wing sections disposed on opposite lateral sides of the center section;

a plurality of tools projecting downwardly from each of the frame sections for performing operating functions as the frame is advanced across a field;

a pair of non-parallel four-bar linkages operably coupling the wing sections with the center section in such a manner that the wing sections are disposed beside the center section in a generally level, upright, lowered position when the frame is unfolded, and stacked in a generally level, upright, raised position directly above the center section and beside one another when the frame is folded; and a pair of power mechanisms operably coupled with the linkages for effecting said folding and unfolding of the frame, each of said wing sections having an inner end and an outer end, each of said linkages including an inner link and an outer link, both links of each linkage being pivotally connected to the corresponding wing section closer to the inner end of the wing section than to the outer end of the wing section.

said center section having a pair of opposite, laterally outer ends and a midpoint between said outer ends.

each inner link being pivotally connected to the center section closer to the midpoint than to the corresponding outer end of the center section, each outer link being pivotally connected to the center section closer to the corresponding outer end of the center section than to the midpoint of the center section. and each outer link being operable to swing through an arc greater than 90° whereby to reduce the height of the implement when the wing sections are stacked above the center section in the folded condition of the frame.

2. In a stack-folding implement as claimed in claim 1, the pivotal connections for each linkage being so located that when the wing section is in its lowered position the pivotal connection of the outer link to the wing section is at a lower level than the pivotal connection of the outer link to the center section, and the pivotal connection of the inner link to the wing section is at a higher level than the pivotal connection of the inner link to the center section, whereby to cause the wing section to temporarily tilt outwardly and upwardly for additional clearance as the wing section moves around the outer end of the center section.

3. In a stack-folding implement as claimed in claim 2, the outer link of each linkage being shorter than the inner link of each linkage.

4. In a stack-folding implement as claimed in claim 2, each of said power mechanisms being operably coupled between the center section and the outer link of the corresponding linkage.

5. In a stack-folding implement as claimed in claim 4, each of said power mechanisms including a hydraulic cylinder and a lost motion coupling between the cylinder and the outer link to provide flotation for the wing section when the wing section is in its lowered position.

6. In a stack-folding implement as claimed in claim 5, said lost-motion coupling having a lock associated therewith for locking the coupling against lost-motion travel as the outer link passes over a top-dead-center position during folding and unfolding of the wing section.

7. In a stack-folding implement as claimed in claim 1, each of said power mechanisms being operably coupled between the center section and the outer link of the corresponding linkage.

8. In a stack-folding implement as claimed in claim 7, each of said power mechanisms including a hydraulic cylinder and a lost motion coupling between the cylinder and the outer link to provide flotation for the wing section when the wing section is in its lowered position.

9. In a stack-folding implement as claimed in claim 8, said lost-motion coupling having a lock associated therewith for locking the coupling against lost-motion travel as the outer link passes over a top-dead-center position during folding and unfolding of the wing section.

10. In a stack-folding implement as claimed in claim 1, each of said power mechanisms being operably coupled between the center section and the outer link of the corresponding linkage.

11. In a stack-folding implement as claimed in claim 10, each of said power mechanisms including a hydraulic cylinder and a lost motion coupling between the cylinder and the outer link to provide flotation for the wing section when the wing section is in its lowered position.

12. In a stack-folding implement as claimed in claim 11, said lost-motion coupling having a lock associated therewith for locking the coupling against lost-motion travel as the outer link passes over a top-dead-center position during folding and unfolding of the wing section.

13. In a stack-folding implement as claimed in claim 1, said inner link of each linkage comprising a rigid link.

14. In a stack-folding implement as claimed in claim 13, said rigid link having a lost-motion pivot connection with the center frame section at an inner end of the rigid link to provide flotation for the wing section when the wing section is in its lowered position.

15. In a stack-folding implement as claimed in claim 14, said rigid link and the center section having an interengageable structure for locking the lost-motion pivot connection against lost-motion movement when the wing section is in its folded position.

16. In a stack-folding implement as claimed in claim 15, the pivotal connections for each linkage being so located that when the wing section is in its lowered position the pivotal connection of the outer link to the wing section is at a lower level than the pivotal connection of the outer link to the center section, and the pivotal connection of the inner link to the wing section is at a higher level than the pivotal connection of the inner link to the center section, whereby to cause the wing section to temporarily tilt outwardly and upwardly for additional clearance as the wing section moves around the outer end of the center section.

17. In a stack-folding implement as claimed in claim 16, the outer link of each linkage being shorter than the inner link of each linkage.

18. In a stack-folding implement as claimed in claim 17, each of said power mechanisms being operably coupled between the center section and the outer link of the corresponding linkage.

19. In a stack-folding implement as claimed in claim 18, each of said power mechanisms including a hydraulic cylinder and a lost motion coupling between the cylinder and the outer link to provide flotation for the wing section when the wing section is in its lowered position.

20. In a stack-folding implement as claimed in claim 19, said lost-motion coupling having a lock associated therewith for locking the coupling against lost-motion travel as the outer link passes over a top-dead-center position during folding and unfolding of the wing section.

21. In a stack-folding implement as claimed in claim 13, the pivotal connections for each linkage being so located that when the wing section is in its lowered position the pivotal connection of the outer link to the wing section is at a lower level than the pivotal connection of the outer link to the center section, and the pivotal connection of the inner link to the wing section is at a higher level than the pivotal connection of the inner link to the center section, whereby to cause the wing section to temporarily tilt outwardly and upwardly for additional clearance as the wing section moves around the outer end of the center section.

22. In a stack-folding implement as claimed in claim 21, the outer link of each linkage being shorter than the inner link of each linkage.

23. In a stack-folding implement as claimed in claim 22, each of said power mechanisms being operably coupled between the center section and the outer link of the corresponding linkage.

24. In a stack-folding implement as claimed in claim 23, each of said power mechanisms including a hydraulic cylinder and a lost motion coupling between the cylinder and the outer link to provide flotation for the wing section when the wing section is in its lowered position.

25. In a stack-folding implement as claimed in claim 24, said lost-motion coupling having a lock associated therewith for locking the coupling against lost-motion travel as the outer link passes over a top-dead-center position during folding and unfolding of the wing section.

26. In a stack-folding implement as claimed in claim 1, said inner link of each linkage comprising a hydraulic cylinder.

27. In a stack-folding implement as claimed in claim 26, each power mechanism including a hydraulic cylinder operably connected between the center section and the outer link of the corresponding linkage, the cylinders of each linkage being plumbed in a master-slave relationship.

28. In a stack-folding implement as claimed in claim 1, said implement comprising a planter in which the tools have portions projecting both upwardly and downwardly from each frame section.

* * * * *